US011077785B2

(12) United States Patent
Pakiman

(10) Patent No.: US 11,077,785 B2
(45) Date of Patent: Aug. 3, 2021

(54) DEVICE FOR SUSPENSION OF A LAMP IN A VEHICLE

(71) Applicant: Ningbo Geely Automobile Research & Development Co., Ltd., Ningbo (CN)

(72) Inventor: Anahita Pakiman, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/886,010

(22) Filed: May 28, 2020

(65) Prior Publication Data

US 2020/0324684 A1  Oct. 15, 2020

Related U.S. Application Data

(63) Continuation of application No. PCT/CN2018/116708, filed on Nov. 21, 2018.

(30) Foreign Application Priority Data

Dec. 19, 2017 (EP) ..................................... 17208551

(51) Int. Cl.
*B60Q 1/04* (2006.01)
*F21S 41/19* (2018.01)

(52) U.S. Cl.
CPC ......... *B60Q 1/0491* (2013.01); *B60Q 1/0416* (2013.01); *F21S 41/192* (2018.01); *F21S 41/196* (2018.01)

(58) Field of Classification Search
CPC .............................. B60Q 1/0491; F21V 15/04
See application file for complete search history.

(56) References Cited

U.S. PATENT DOCUMENTS 2,138,076 A * 11/1938 Taylor .................. B60Q 1/0683
362/372
2,781,443 A * 2/1957 Cargle ................. B60Q 1/2626
362/485
(Continued)

FOREIGN PATENT DOCUMENTS

CN         101469820 A     1/2003
CN         101469820 A     7/2009
(Continued)

OTHER PUBLICATIONS

International Search Report from corresponding International Application No. PCT/CN2018/116708, dated Feb. 26, 2019, 5 pages.
(Continued)

*Primary Examiner* — Alexander K Garlen
(74) *Attorney, Agent, or Firm* — Tucker Ellis LLP

(57) ABSTRACT

A device for suspension of a lamp in a vehicle. The device includes a guiding means for guiding the lamp to move relative to the vehicle from a first position to a second position in case of an impact between the lamp and an object. The device further includes at least one energy absorber for counteracting movement of the lamp from the first position to the second position. The guiding means is arranged for guiding the lamp to move inwardly in a movement direction having a movement direction component in parallel with the X-axis while the movement of the lamp being counteracted by one said energy absorber, and to pivot about an axis being transverse relative to the X-axis and the Z-axis, while the pivot motion being counteracted by one said energy absorber, giving the lamp a different orientation in the second position in comparison to the first position.

22 Claims, 6 Drawing Sheets

(56) References Cited

U.S. PATENT DOCUMENTS

| | | | | |
|---|---|---|---|---|
| 4,118,765 | A * | 10/1978 | Atsuchi | B60Q 1/068 362/384 |
| 4,475,148 | A * | 10/1984 | Tomforde | B60Q 1/0458 362/549 |
| 5,863,107 | A * | 1/1999 | Dobler | B60Q 1/0064 362/289 |
| 6,135,619 | A * | 10/2000 | Donaire Camacho | B60Q 1/0433 362/288 |
| 6,478,456 | B1 * | 11/2002 | Eichhorn | B60Q 1/0416 362/369 |
| 7,204,336 | B2 * | 4/2007 | Arlon | B60R 21/34 180/274 |
| 9,174,568 | B2 * | 11/2015 | Nemoto | F21S 45/10 |
| 2002/0051366 | A1 * | 5/2002 | Oh | B60Q 1/0491 362/549 |
| 2003/0142503 | A1 * | 7/2003 | Ericsson | B60Q 1/0425 362/487 |
| 2004/0057249 | A1 * | 3/2004 | Arion | B60Q 1/0491 362/546 |
| 2004/0125584 | A1 * | 7/2004 | Arlon | B60Q 1/0491 362/21 |
| 2007/0091624 | A1 * | 4/2007 | Takata | B60Q 1/0491 362/459 |
| 2014/0233255 | A1 * | 8/2014 | Inamura | B60Q 1/0491 362/546 |
| 2014/0293638 | A1 * | 10/2014 | Krajenke | B60Q 1/0491 362/523 |
| 2018/0086250 | A1 * | 3/2018 | Puente | B60Q 1/0491 |

FOREIGN PATENT DOCUMENTS

| | | | |
|---|---|---|---|
| CN | 206504242 U | 9/2017 | |
| CN | 107314321 A | 11/2017 | |
| DE | 3802104 A1 | 8/1989 | |
| DE | 10030373 A1 * | 1/2002 | B60Q 1/0491 |
| DE | 102014103891 A1 | 10/2014 | |
| EP | 1346874 A1 | 9/2003 | |
| EP | 1431116 A2 | 6/2004 | |
| EP | 1645465 A1 | 4/2006 | |
| FR | 2844755 B1 * | 2/2007 | B60Q 1/0491 |
| FR | 2901202 A1 | 11/2007 | |
| GB | 2321624 A | 8/1998 | |
| JP | H02127138 A | 5/1990 | |
| JP | H0930321 A | 2/1997 | |
| JP | 2000100228 A | 4/2000 | |
| KR | 20030000251 A | 1/2003 | |

OTHER PUBLICATIONS

Extended European Search Report from corresponding European Application No. 17208551.6, dated May 22, 2018, 4 pages.

* cited by examiner

DEVICE FOR SUSPENSION OF A LAMP IN A VEHICLE

RELATED APPLICATION DATA

This application is a continuation of International Application No. PCT/CN2018/116708, filed Nov. 21, 2018, which claims the benefit of European Application No. 17208551.6, filed Dec. 19, 2017, the disclosures of which are incorporated herein by reference in their entireties.

TECHNICAL FIELD

The invention relates to a device for suspension of a lamp in a vehicle, and a vehicle comprising such a lamp suspension device.

BACKGROUND

During a collision of a vehicle with a pedestrian, the pedestrian often collides with the head on the hood and/or the fender of the vehicle. Further, any lamp arranged in the front of the vehicle may constitute a relative hard structure. To mitigate injuries to pedestrians, vehicles are usually adapted to yield in response to forces generated by a pedestrian impact. For example, the vehicle may be equipped with a pedestrian air bag or a device for changing the inclination angle of the hood, etc.

SUMMARY

An objective of the invention is to provide a device for suspension of a lamp in a vehicle, which device will reduce pedestrian injuries in case of a head impact to the lamp.

The objective is achieved by a device for suspension of a lamp in a vehicle, which device comprises a guiding means for guiding the lamp to move relative to the vehicle from a first position to a second position in case of an impact between the lamp and an object, and at least one energy absorber for counteracting movement of the lamp from the first position to the second position, wherein the guiding means is arranged for guiding the lamp to move inwardly in a movement direction having a movement direction component in parallel with the X-axis while the movement of the lamp being counteracted by one said energy absorber, and to pivot about an axis being transverse relative to the X-axis and the Z-axis, while the pivot motion being counteracted by one said energy absorber, giving the lamp a different orientation in the second position in comparison to the first position.

The invention is based on the insight that by such a device, energy can be absorbed during the impact even if the space close to the lamp is limited, particularly for a lamp mounted on a position in the hood and/or the front wheel fender area where the lamp has a major part of an exterior surface facing upwardly with a surface normal having a major direction component in parallel with the Z-axis. If the space available for movement of the lamp in the Z-direction is limited, energy can be absorbed by the movement in the X-direction and the pivot motion. This in turn will improve the pedestrian safety in case of an impact.

The directions and axes used herein, i.e. the X-axis, Y-axis and the Z-axis, constitute a cartesian coordinate system arranged relative to a vehicle such that the X-axis is in parallel with the horizontal longitudinal extension of the vehicle, the Y-axis is in parallel with the horizontal lateral extension of the vehicle, thus being perpendicular to the X-axis, and the Z-axis is in parallel with a vertical extension of the vehicle, thus being perpendicular to the X-axis and the Y-axis.

According to one embodiment, the guiding means is arranged for guiding the lamp such that said movement direction has a movement direction component in parallel to the Z-axis. Hereby, the energy absorption can be further improved in case there is a space available for movement of the lamp in the Z-direction.

According to another embodiment, the pivot axis is substantially perpendicular to the X-axis, and preferably the pivot axis is substantially perpendicular to the Z-axis. Hereby, the energy absorption can be further improved since the orientation of the pivot axis relative to an impact direction is often favourable.

According to a further embodiment, the guiding means comprises a first guide rail mechanism arranged for connecting a front end of the lamp to the vehicle and a second guide rail mechanism arranged for connecting a rear end of the lamp to the vehicle. Herby, the movement and the pivot motion of the lamp can be achieved, for example by guiding the lamp in the movement direction by means of the first guide rail mechanism and guiding the lamp to pivot by means of the second guide rail mechanism.

According to a further embodiment, the first guide rail mechanism comprises a first guide portion for guiding the lamp in said movement direction having a movement direction component in parallel with the X-axis and a movement direction component in parallel with the Z-axis, and a second guide portion for subsequently guiding the lamp in said movement direction being substantially in parallel with the X-axis. Hereby, the space available for movement of the lamp can be efficiently used for energy absorption if the space available in the X-direction is larger than the space available in the Z-direction.

According to a further embodiment, the guiding means comprises a pivot arm for guiding the lamp to pivot about the pivot axis, and preferably the pivot arm comprises a first arm unit and a second arm unit, a first end of the first arm unit being pivotally connectable to the vehicle, a second end of the first arm unit and a first end of the second arm unit being pivotally connected to each other, the second arm unit constituting a guide rail mechanism for guiding the lamp to move from a second end of the second arm unit towards the first end of the second arm unit. Hereby, a translation motion of the lamp can be used for achieving a pivot motion of the lamp.

According to another aspect of the invention, a further objective is to provide a vehicle, which vehicle will reduce pedestrian injuries in case of a head impact to a vehicle lamp. This objective is achieved by a vehicle provided with a device according to the invention.

The advantages of the vehicle are the same as the advantages already discussed hereinabove with reference to the embodiments of the device.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1A:
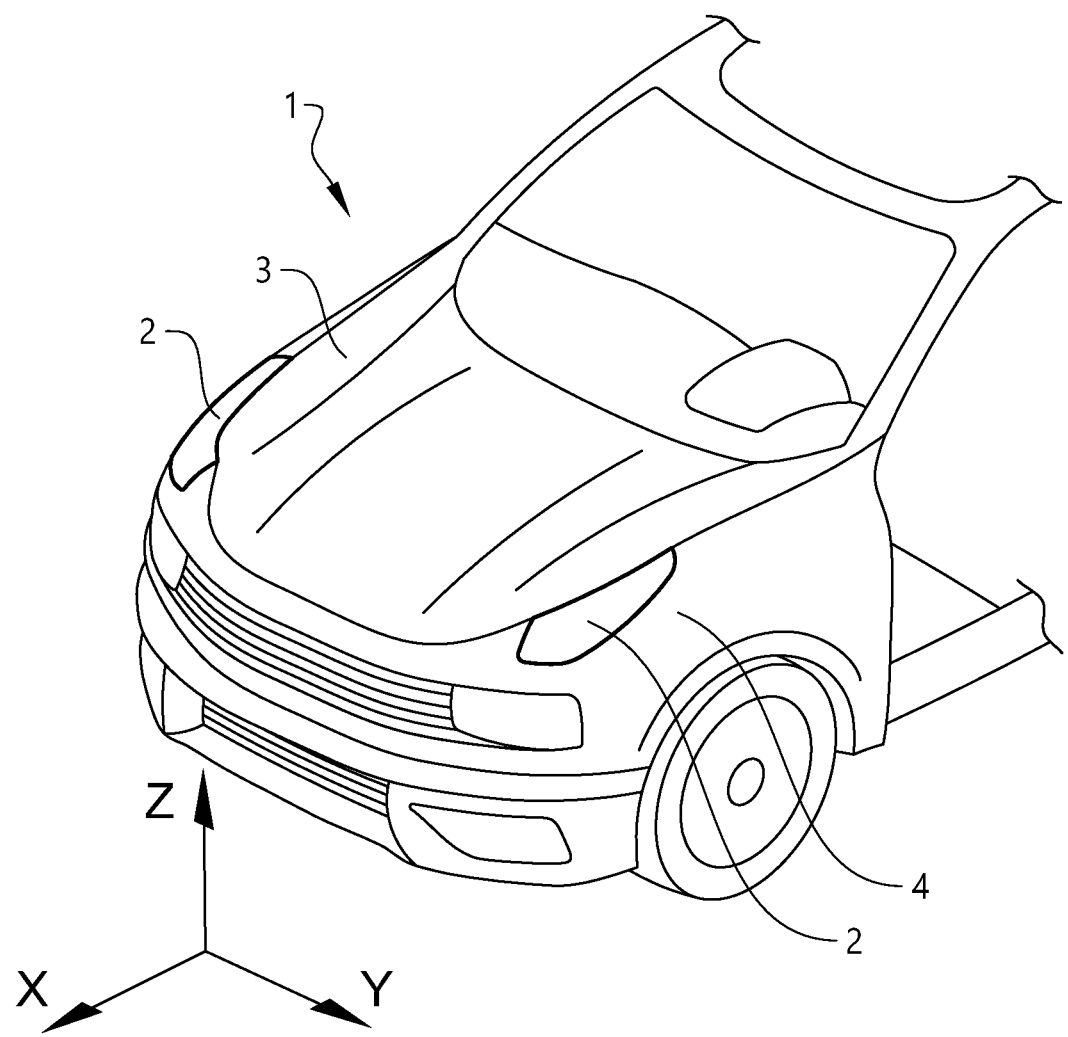
FIG. 1A is a perspective front view of a vehicle.
Figure 1B:
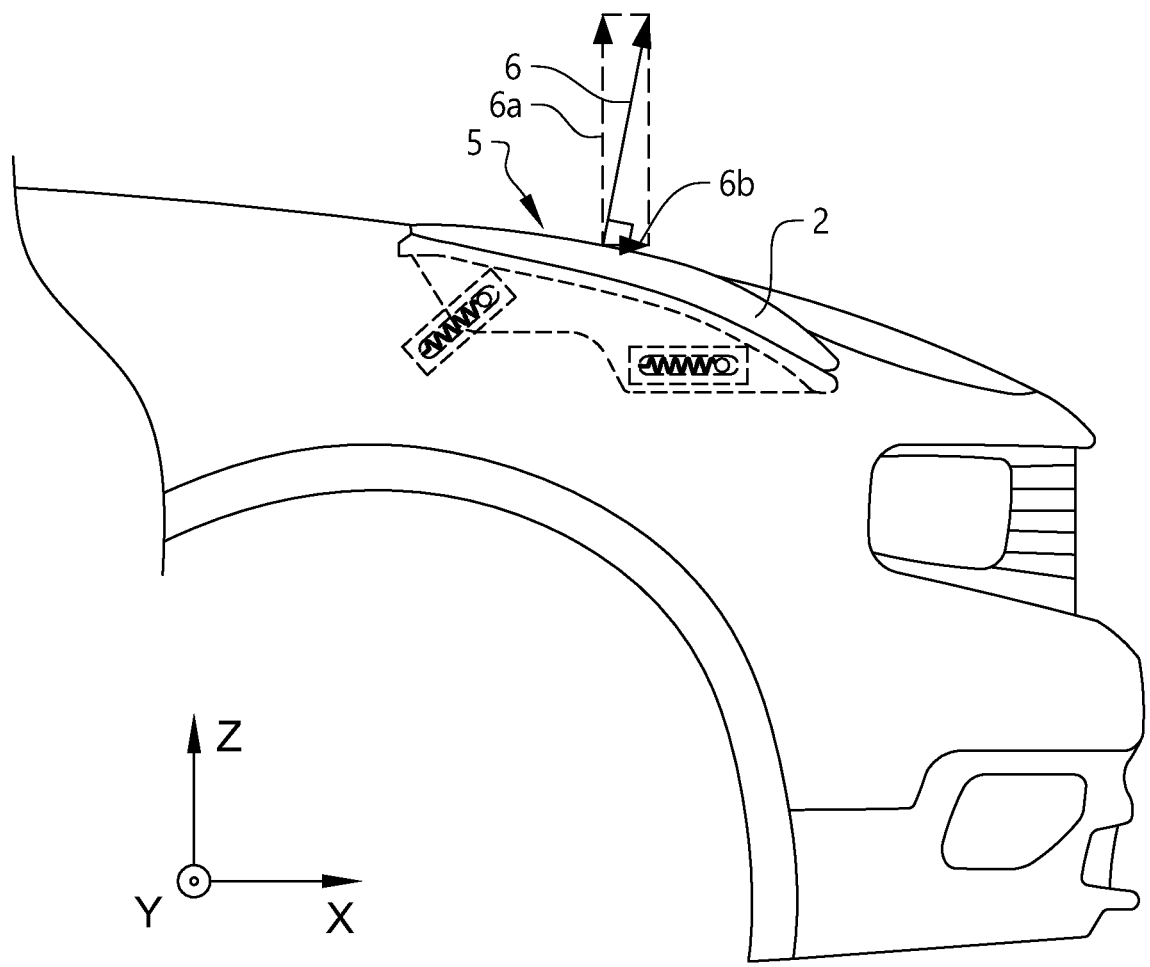
FIG. 1B is a side view of the vehicle illustrated in FIG. 1A.

FIG. 1A is a perspective view of a vehicle 1 and FIG. 1B shows the vehicle 1 in a side view. A cartesian coordinate system having axes X, Y and Z is also shown. The vehicle 1 and the individual components will be described herein with reference to this coordinate system. The vehicle 1 has two supplement lamps 2 for daytime running light (DRL) arranged in the hood and front wheel fender area of the vehicle 1. One such lamp 2 is arranged on the left side of the vehicle 1 at the boundary between the hood 3 and the adjacent front wheel fender 4. In the same way the other lamp 2 is arranged on the right side of the vehicle.

As can be seen in FIG. 1B, the lamp 2 can be arranged such that a major part of an exterior surface 5 of the lamp faces upwardly with a surface normal 6 having a major direction component 6a in parallel with the Z-axis. This does not necessarily mean that the surface 5 of the lamp is completely horizontal. In FIG. 1B, where the lamp 2 on the right side of the vehicle 1 is illustrated, the lamp 2 is somewhat inclined relative to the X-axis, but the surface normal 6 of the lamp 2 has a larger component 6a in a direction in parallel with the Z-axis than a component 6b in a direction in parallel with the X-axis. The surface 5 can also be somewhat inclined relative to the Y-axis.

For example, the exterior surface 5 of the lamp can be inclined relative to the X-axis with an angle α selected in the range 0≤α<45°, preferably 0≤α≤30°, and relative to the Y-axis with an angle β selected in the range 0≤β<45°, preferably 0≤β≤30°. If the exterior surface of the lamp 2 is inclined relative to the X-axis, preferably the rear part of the exterior surface of the lamp is arranged at a higher level than the front part of the exterior surface of the lamp 2, and if the exterior surface of the lamp 2 is inclined relative to the Y-axis, preferably the inner part of the exterior surface of the lamp 2 is arranged at a higher level than the outer part of the exterior surface of the lamp 2.

Although the exterior surface of the lamp does not need to be horizontal, preferably the projected surface of the lamp seen in a direction in parallel with the Z-axis has however a considerable area that could be subject to an impact with an object.

Further, the lamp 2 is suitably arranged such that an exterior surface 5 of the lamp is substantially flush with an exterior surface of the hood 3 and the front wheel fender 4 of the vehicle 1.

The lamp 2 is suspended in the vehicle 1 by means of a vehicle lamp suspension device 7 that will be described in detail hereinbelow.

Figure 2A:
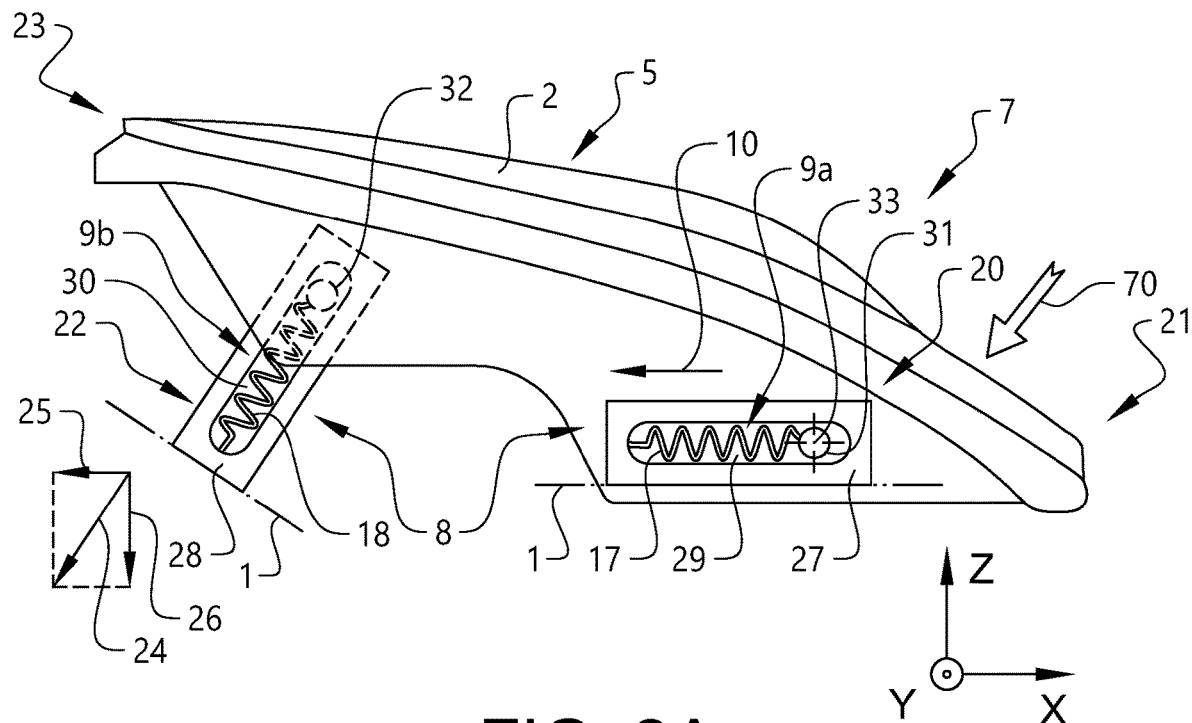
FIG. 2A is a side view of one embodiment of a device for suspension of a lamp in a vehicle and a lamp seen in a direction in parallel to the Y-axis.

FIG. 2A shows a device 7 for suspension of the lamp 2 in the vehicle 1. The device 7 comprises a guiding means 8 for guiding the lamp 2 to move relative to the vehicle 1 from a first position to a second position in case of an impact between the lamp and an object. The device 7 also comprises at least one energy absorber 9a, 9b for counteracting movement of the lamp from the first position to the second position.

The guiding means 8 is arranged for guiding the lamp to move inwardly in a movement direction 10 having a movement direction component in parallel with the X-axis while the movement of the lamp being counteracted by one said energy absorber, and to pivot about an axis being transverse relative to the X-axis and the Z-axis, while the pivot motion being counteracted by one said energy absorber, giving the lamp a different orientation in the second position in comparison to the first position. The pivot axis is a geometrical axis that can be situated on the lamp or at a distance from the lamp.

The expression "movement direction" used herein refers to the resulting translation motion direction, whereas "movement direction component" is a component contributing to the "movement direction".

By "transverse" is meant a direction that can deviate from a direction perpendicular to the X-axis and Z-axis. The deviation can be within ±30°, preferably ±20° and often within ±10° from a direction perpendicular to the current axis.

The guiding means is suitably arranged for guiding the lamp to move such that the movement direction component in parallel with the X-axis is considerably larger than any movement direction component in parallel with the Y-axis, and preferably the guiding means is arranged for guiding the lamp to move such that the movement direction is substantially in the XZ-plane.

In the example embodiment illustrated in FIG. 2A, the guiding means 8 comprises a first guide rail mechanism 20 arranged for connecting a front end 21 of the lamp 2 to the vehicle 1 and a second guide rail mechanism 22 arranged for connecting a rear end 23 of the lamp to the vehicle 1. The first guide rail mechanism 20 can be arranged for guiding the lamp 2 to move with a movement direction 10 having a movement direction component in parallel with the X-axis that is considerably larger than a movement direction component in parallel to the Z-axis, and preferably for guiding the lamp to move inwardly such that the movement direction 10 is substantially in parallel with the X-axis.

As an example, the guiding means can comprise two said first guide rail mechanisms arranged spaced apart from each other in the pivot axis direction, and one said second guide rail mechanism.

The second guide rail mechanism 22 is arranged for guiding the lamp 2 to move inwardly and downwardly in a movement direction 24 having a movement direction component 25 in parallel with the X-axis and a movement direction component 26 in parallel with the Z-axis. In case of an impact, the lamp will move inwards and pivot because the rear end of the lamp is moved downwards with the movement direction component 26. Here, the geometrical pivot axis 33 is substantially perpendicular to the X-axis and the Z-axis, i.e. the pivot axis extends substantially in parallel with the Y-axis.

Thus, in the example embodiment illustrated in FIG. 2A, the guiding means 8 is arranged for guiding the lamp 2 to pivot about the pivot axis for giving a rear part of the lamp 2 a lower position in the second position of the lamp after an impact in comparison to the first position of the lamp before impact, and preferably for giving a front part of the lamp a higher position in the second position in comparison to the first position.

Each said guide rail mechanism 20, 22 may comprise a flange unit 27, 28 having a slot 29, 30 for receiving a pin 31, 32. The slot is arranged for guiding the pin for achieving the desired translation motion and pivot motion of the lamp 2. Although each flange unit 27, 28 is suitably adapted to be attached to the vehicle 1 and receive the pin 31, 32 which is arranged on the lamp, it would also be possible to instead arrange the pin to be fixed relative to the vehicle and arrange the slot in the lamp.

Since the pivot axis 33 of the lamp 2 is the centre of the pin 31, the pivot axis 33 will move with the translation motion in the movement direction 10.

Figure 2B:
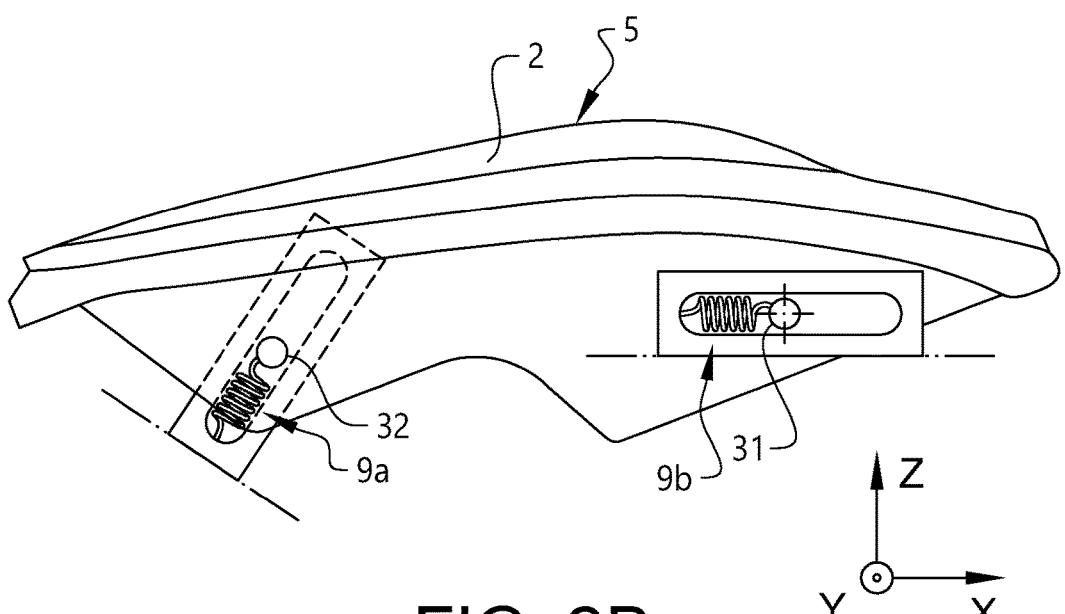
FIG. 2B shows the lamp in FIG. 2A in case of an impact in the front part of the lamp.

FIG. 2B shows the lamp 2 after an impact 70 (schematically illustrated in FIG. 2A) in the front part of the lamp 2 where the lamp has been moved to the second position. The energy absorbers 9a, 9b are compressed, and the lamp has a position and orientation different from the position and orientation before the impact as illustrated in FIG. 2A. In the context of position of the impact 70, the expressions rear part, front part and centre part of the lamp are used with respect to the position along the X-axis.

In the example embodiment illustrated in FIGS. 2A and 2B, the pin 32 is moved inwards and downwards, and the pin 31 is moved inwards and pivoted relative to the flange unit 27. Thus, the lamp 2 will pivot counter clockwise (when seen in the Y-axis direction) about the pivot axis 33 extending through the centre of the pin 31.

Figure 2C:
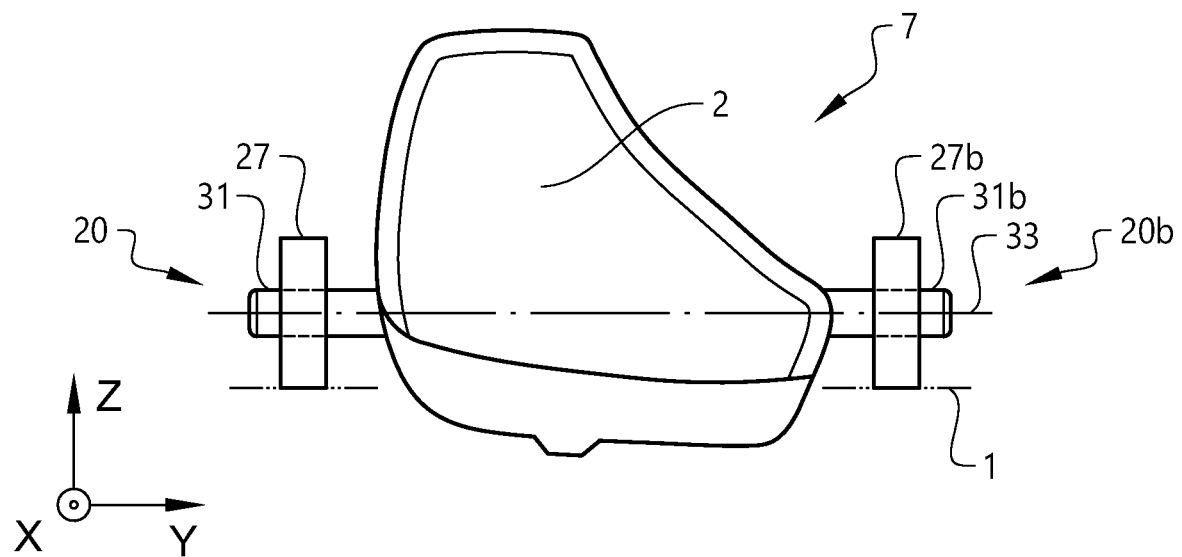
FIG. 2C is a front view of the device illustrated in FIG. 2A, FIG. 2D indicates the orientation of the lamp in FIGS. 2A and 2B before and after impact, respectively.

FIG. 2C is a front view of the device 7 illustrated in FIG. 2A. The device has two first guide rail mechanisms 20, 20b with two flange units 27, 27b. The pivot axis 33 extends through the pins 31, 31b.

Figure 2D:
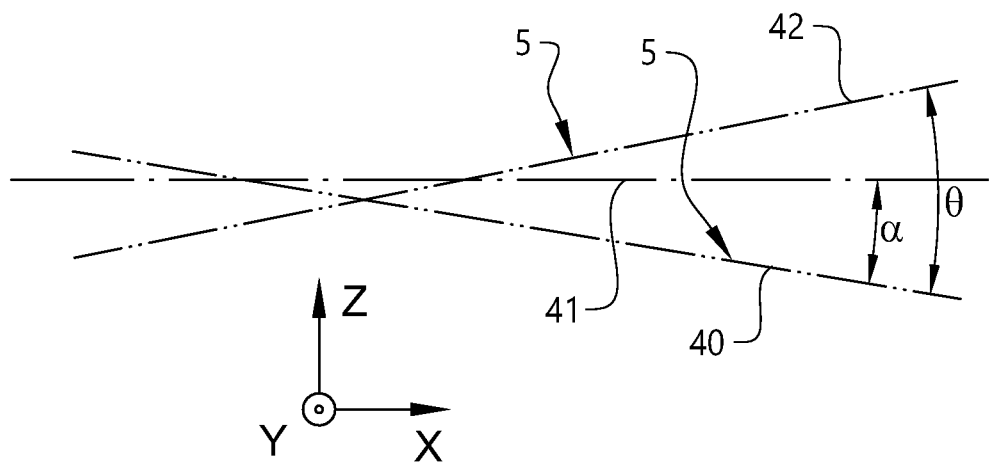

FIG. 2D indicates the orientation of the lamp in FIGS. 2A and 2B. As mentioned above, due to the pivot motion of the lamp about the geometrical pivot axis, the lamp is given a different orientation in the second position in comparison to the first position. The guiding means can be arranged for guiding the lamp such that looked at the lamp in a direction substantially in parallel with the Y-axis, the orientation of the lamp in the second position is inclined with an angle $\ominus$ relative to the orientation of the lamp in the first position, where $\ominus$ is within the range $5°<\ominus<70°$. The angle $\ominus$ is often within the range $10°<\ominus<60°$, and preferably $20°<\ominus<50°$. In FIG. 2D, a lower line 40 indicates the orientation of the exterior surface 5 of the lamp relative to a line 41 in parallel with the X-axis by the angle $\alpha$ before impact. An upper line 42 indicates the exterior surface 5 of the lamp after impact relative to the exterior surface before impact by the angle $\ominus$.

With reference to FIG. 2A, the vehicle lamp suspension device 7 has a first energy absorber 9a including a first spring 17 and a second energy absorber 9b including a second spring 18. The first energy absorber 9a is attached to the vehicle 1, for example the flange unit 27, and can be compressed by the pin 31. The second energy absorber 9b is attached to the vehicle 1, for example the flange unit 28, and can be compressed by the pin 32.

Although an energy absorber in form of a spring arranged such as the first and second energy absorbers 9a, 9b in FIG. 2A, will create a counterforce only when the lamp causing the spring to be compressed, in another example embodiment the energy absorber could be arranged for providing a counterforce when the energy absorber is stretched.

One or more energy absorbers can be used. The energy absorber can be any kind of metal spring, foam, plastic component, etc., that preferably has a non-linear spring constant. By such an energy absorber having a spring constant that increases with the movement of the lamp from the first position towards the second position, energy can be absorbed in an efficient way. For example, a spring can have a non-linear spring constant increasing with increased compression of the spring.

Further, the lamp suspension device or any other part of the vehicle may comprise an attachment component for mechanical connection of the lamp to the vehicle. Such an attachment component can be used for connecting the lamp to the vehicle and keeping the lamp in an intended position, for example the first position mentioned above, in absence of any impact. In such a case, the lamp is releasable from this connection to the vehicle in case of an impact. The lamp has preferably a break off feature withstanding static loads. For example, such an attachment component can be broken in case of an impact and thereafter the movement of the lamp during impact is mainly determined by the guiding means and the energy absorber. Optionally, the guiding means can be used also for connecting the lamp to the vehicle and keeping the lamp in the intended first position.

Figure 3:
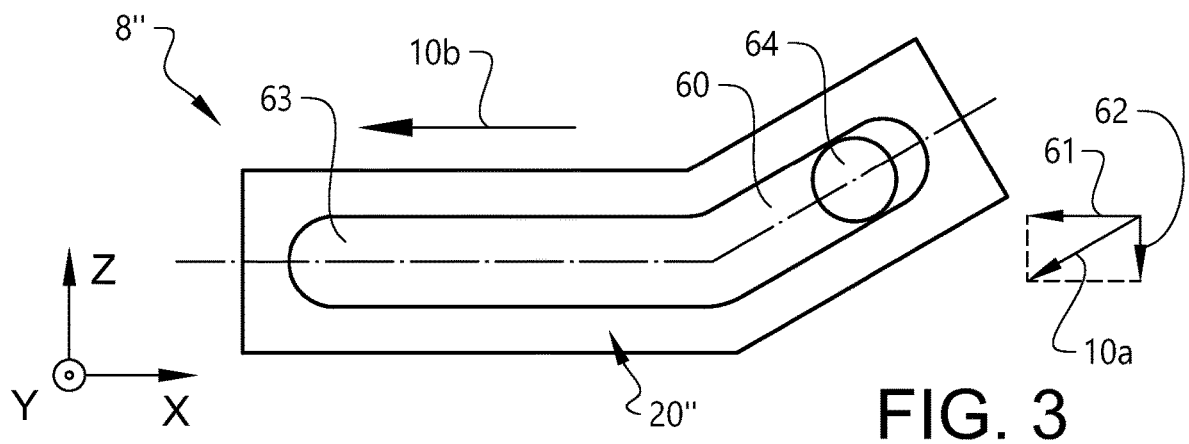
FIG. 3 is a variant of a guiding means.

FIG. 3 shows a variant of a guiding means for the vehicle lamp suspension device illustrated in FIG. 2A. The guiding means 8" comprises a first guide rail mechanism 20" with a first guide portion 60 for guiding the lamp in a first movement direction 10a having a movement direction component 61 in parallel with the X-axis and a movement direction component 62 in parallel with the Z-axis, and a second guide portion 63 for subsequently guiding the lamp in a second movement direction 10b being substantially in parallel with the X-axis. A pin 64 is also indicated in the first guide portion 60.

Figure 4A:
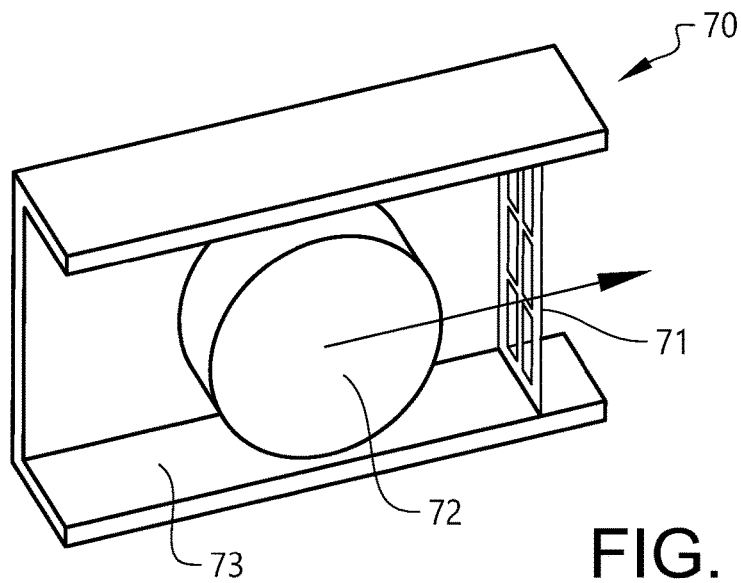
FIG. 4A shows a blocking component.
Figure 4B:
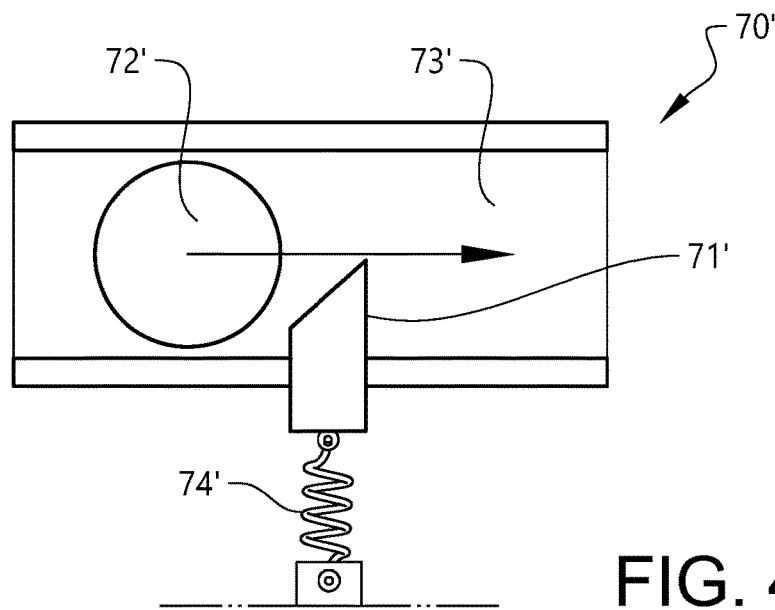
FIG. 4B shows a variant of a blocking component.

FIGS. 4A and 4B show in schematic illustrations two embodiments of a blocking component 70, 70'. The blocking component can be arranged in one or more guiding means, for example in one or more guide rail mechanisms. The blocking component should prevent unintentional movement of the lamp from the first position to the second position. Further, the blocking component allows movement of the lamp from the first position towards the second position to be initiated provided that a force acting on the lamp during impact exceeds a threshold value, and otherwise the blocking component prevents movement of the lamp from the first position towards the second position to be initiated.

As illustrated in FIG. 4A the blocking component may comprise a unit 71, such as a thin wall arranged to break off when the force exceeds the threshold value. For example, a pin 72 in a slot 73 will break the wall unit 71 at a certain force created by an impact between the lamp and an object. As soon as the threshold value is exceeded, the movement of the pin 72 along the slot 73 can continue and thus the movement of the lamp from the first position to the second position while being counteracted by the energy absorber can take place.

Figure 5A:
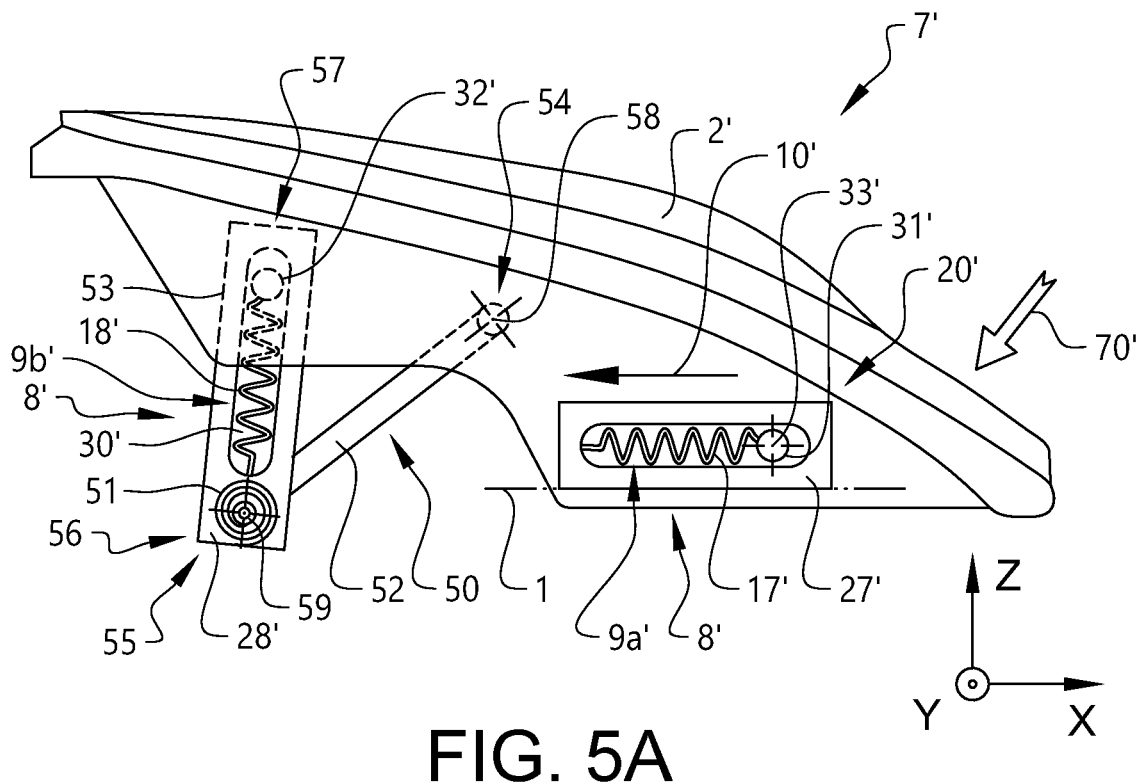
FIG. 5A is a variant of a device for suspension of a lamp in a vehicle and a lamp seen in a direction in parallel to the Y-axis.

As illustrated in FIG. 4B, the blocking component may comprise a unit 71' arranged to spring away when the force exceeds the threshold value. For example, a pin 72' in a slot 73' will overcome the force of a spring 74' at a certain force created by an impact between the lamp and an object. As soon as the threshold value is exceeded, the movement of the pin 72' along the slot 73' can continue and thus the movement of the lamp from the first position to the second position while being counteracted by the energy absorber can take place. FIG. 5A shows a variant of a device 7' for suspension of a lamp 2' in a vehicle. The guiding means 8' of the device 7' has a first guide rail mechanism 20' as already described with reference to FIG. 2A. Further, the guiding means 8' comprises a pivot arm 50 for guiding the lamp 2' to pivot about the pivot axis 33'. In the example embodiment illustrated in FIG. 5A, the pivot arm 50 comprises a first arm unit 52 and a second arm unit 53. A first end 54 of the first arm unit 52 is pivotally connectable to the vehicle 1. The first arm unit 52 can pivot about an axis 58. A second end 55 of the first arm unit 52 and a first end 56 of the second arm unit 53 are pivotally connected to each other for pivoting about an axis 59. The second arm unit 53 constitutes a guide rail mechanism for guiding a pin 32', and thereby the lamp 2', to move from a second end 57 of the second arm unit 53 towards the first end 56 of the second arm unit 53.

Figure 5B:
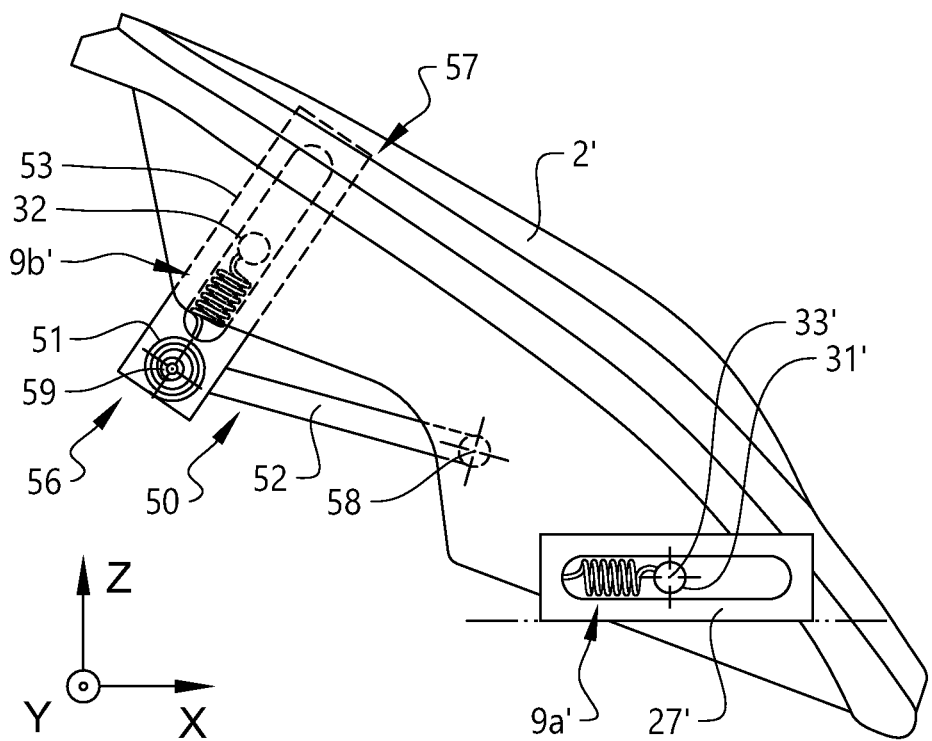
FIG. 5B shows the lamp in FIG. 5A in case of an impact in the front part of the lamp.

FIG. 5B shows the lamp 2' after an impact 70' (schematically illustrated in FIG. 5A) in the front part of the lamp 2' where the lamp has been moved to the second position. The energy absorbers 9a', 9b' are compressed, and the lamp has a position and orientation different from the position and orientation before the impact as illustrated in FIG. 5A. In the context of position of the impact 70', the expressions rear part, front part and centre part of the lamp are used with respect to the position along the X-axis.

In the example embodiment illustrated in FIGS. 5A and 5B, the pin 31' is moved inwards and pivoted relative to the flange unit 27'. The lamp 2' will pivot clockwise (as seen in the Y-axis direction) about the pivot axis 33' extending through the centre of the pin 31'. Here, the guiding means 8' is arranged for guiding the lamp 2' to pivot about the pivot axis 33' for giving a rear part of the lamp a higher position in the second position in comparison to the first position, and preferably for giving a front part of the lamp a lower position in the second position in comparison to the first position.

With reference to FIG. 5A, the vehicle lamp suspension device 7' has a first energy absorber 9a' including a first spring 17' and a second energy absorber 9b' including a second spring 18'. The first energy absorber 9a' is attached to the vehicle 1, for example the flange unit 27', and can be compressed by the pin 31'. The second energy absorber 9b' is attached to the flange unit 28' and can be compressed by the pin 32'.

Further, in addition to the energy absorbers 9a', 9b' arranged at the first and second guide rail mechanisms, an energy absorber 51 for counteracting the pivot motion between the first arm unit 52 and the second arm unit 53 of the pivot arm 50 is arranged at the pivot axis 59. This is schematically illustrated by a spring 51 that is arranged to extend between the first arm unit 52 and the second arm unit 53 of the pivot arm 50.

It is to be understood that the present invention is not limited to the embodiments described above and illustrated in the drawings; rather, the skilled person will recognize that many changes and modifications may be made within the scope of the appended claims.

The invention claimed is:

1. A device for suspension of a lamp in a vehicle, the device comprising:
    at least one guide rail configured to guide the lamp to move relative to the vehicle from a first position to a second position in case of an impact between the lamp and an object; and
    at least one energy absorber configured to counteract movement of the lamp from the first position to the second position,
    wherein movement of the lamp relative to the vehicle from the first position to the second position includes:
        translation of the lamp inwardly relative to the vehicle in a movement direction having a first movement direction component parallel with an X-axis, movement in the movement direction counteracted by the at least one energy absorber, and
        pivoting of the lamp about a pivot axis transverse both the X-axis and an Z-axis, the pivot axis translating in at least the first movement direction component with the translation of the lamp, and the pivoting counteracted by the at least one energy absorber, and
    wherein the lamp has a different orientation in the second position in comparison to the first position, and
    wherein the at least one guide rail is further configured to guide the lamp with a second movement direction component parallel with the Z-axis.

2. The device according to claim 1, wherein the at least one guide rail is configured to guide the lamp to move such that the movement direction is substantially in the XZ-plane.

3. The device according to claim 1, wherein the at least one guide rail is configured to guide the lamp to move such that the movement direction is substantially parallel with the X-axis.

4. The device according to claim 1, wherein the pivot axis is substantially perpendicular to the X-axis.

5. The device according to claim 1, wherein the pivot axis is substantially perpendicular to the Z-axis.

6. The device according to claim 1, wherein the at least one guide rail is configured to guide the lamp to pivot about the pivot axis so that a rear part of the lamp has a higher elevational position in the second position compared to the first position and/or so that a front part of the lamp has a lower elevational position in the second position compared to the first position.

7. The device according to claim 1, wherein the at least one guide rail is configured to guide the lamp to pivot about the pivot axis so that a rear part of the lamp has a lower elevational position in the second position compared to the first position and/or so that a front part of the lamp has a higher elevational position in the second position compared to the first position.

8. The device according to claim 1, wherein the at least one guide rail is configured to guide the lamp such that, looking at the lamp in a direction parallel with the Y-axis, an orientation of the lamp in the second position is inclined with an angle θ relative to an orientation of the lamp in the first position, where θ is within the range 5°<θ<70°.

9. The device according to claim 1, wherein the device further comprises a blocking component that allows initiation of movement of the lamp from the first position towards the second position in response to a force acting on the lamp that exceeds a threshold value, and otherwise preventing in initiation of the movement of the lamp from the first position towards the second position.

10. The device according to claim 9, wherein the blocking component comprises a unit that is configured to break in response to the force exceeding the threshold value.

11. The device according to claim 9, wherein the blocking component comprises a unit that is configured to spring away in response to the force exceeding the threshold value.

12. The device according to claim 1, wherein the at least one guide rail comprises a first guide rail configured to connect a front end of the lamp to the vehicle and a second guide rail configured to connect a rear end of the lamp to the vehicle.

13. The device according to claim 12, wherein the first guide rail guides the lamp in only the first movement direction component.

14. The device according to claim 12, wherein the first guide rail comprises a first guide portion that guides the lamp in the movement direction having the first and second movement direction components, and a second guide portion that subsequently guides the lamp in the first movement direction component.

15. The device according to claim 12, wherein the first guide rail and the second guide rail are spaced apart from each other in a direction parallel with the pivot axis.

16. The device according to claim 12, wherein the second guide rail is configured to guide the lamp in the movement direction having the first and second movement direction component.

17. The device according to claim 1, wherein the device further comprises a pivot arm configured to guide the lamp to pivot about the pivot axis.

18. The device according to claim 17, wherein the pivot arm comprises a first arm unit and a second arm unit, a first end of the first arm unit pivotally connected to the vehicle, a second end of the first arm unit and a first end of the second arm unit pivotally connected to each other, the second arm unit constituting a guide rail configured to guide the lamp to move from a second end of the second arm unit towards the first end of the second arm unit.

19. The device according to claim 18, wherein the second arm unit has a slot configured to receive a pin and guide the pin to move from the second end of the second arm unit to the first end of the second arm unit.

20. A vehicle comprising a device according to claim 1.

21. The vehicle according to claim 20, wherein the vehicle comprises the lamp and the lamp is arranged on the vehicle such that a major part of an exterior surface of the lamp faces upwardly and has a direction normal the major part having a major direction component parallel with the Z-axis.

22. The vehicle according to claim 20, wherein the vehicle comprises the lamp and the lamp is arranged on the vehicle such that an exterior surface of the lamp is substantially flush with an exterior surface of at least one of a hood of the vehicle or a front wheel fender of the vehicle.

* * * * *